UNITED STATES PATENT OFFICE.

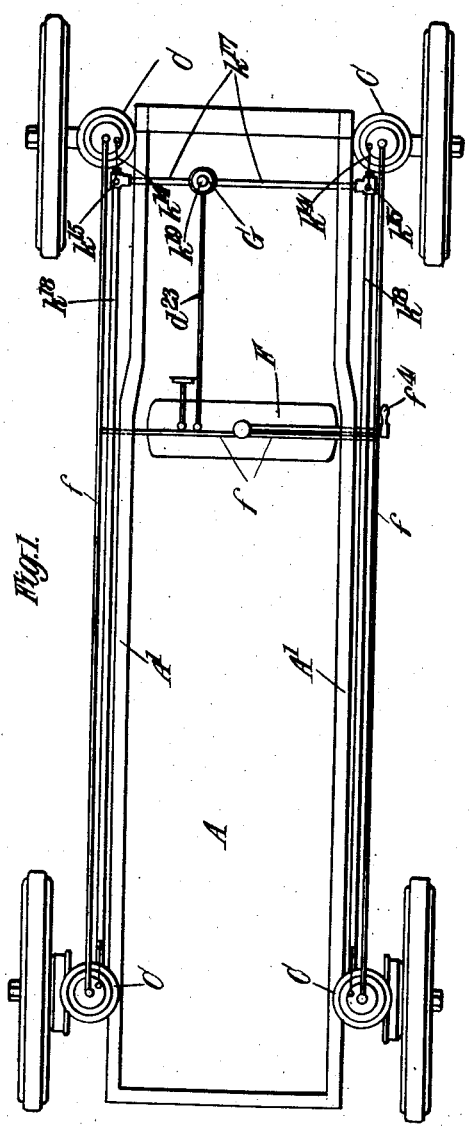

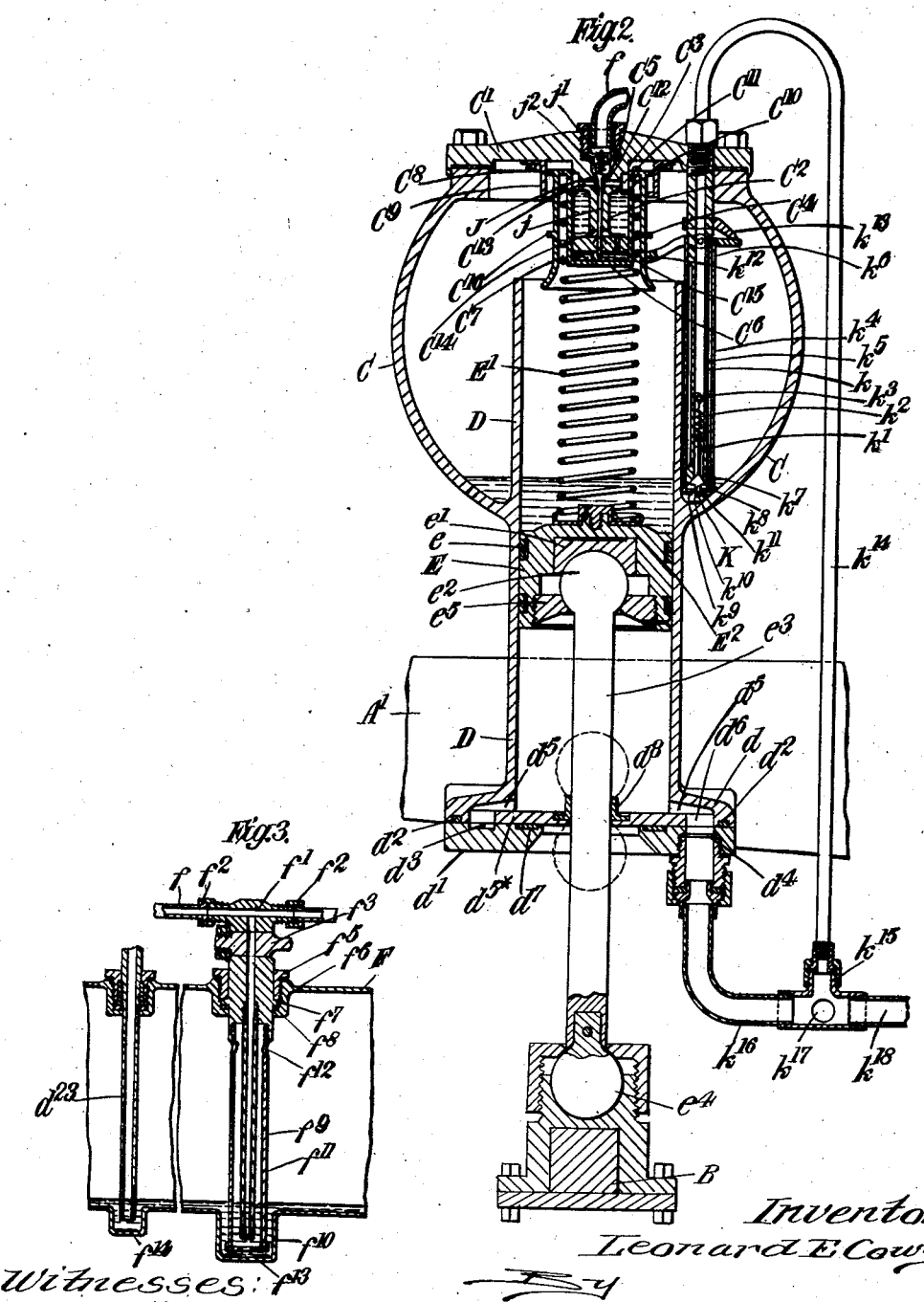

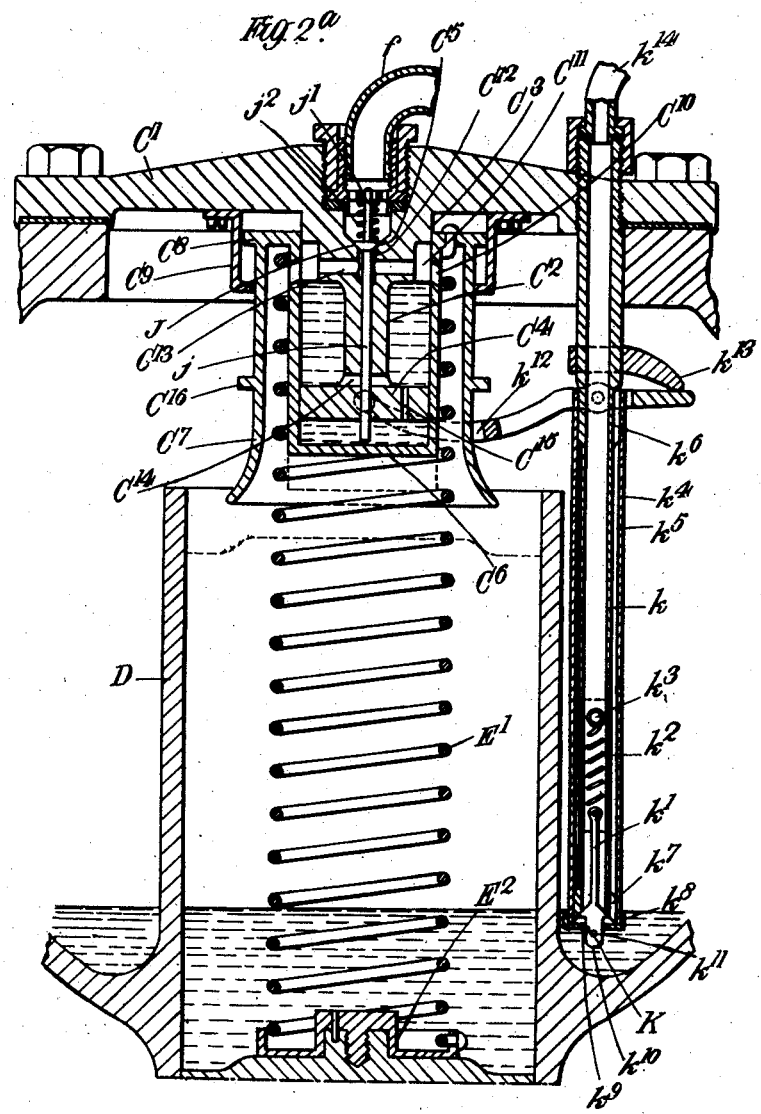

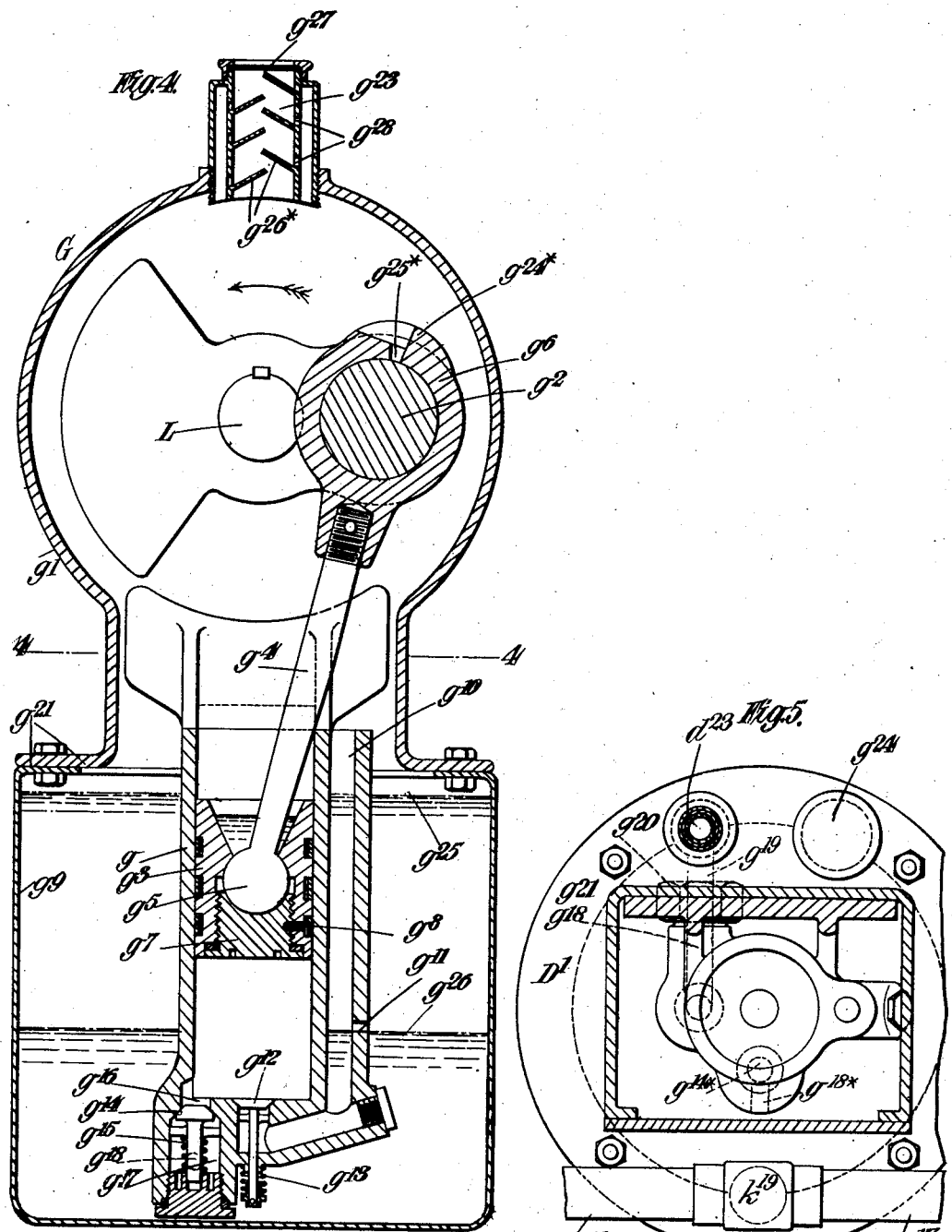

LEONARD EUGENE COWEY, OF KEW GARDENS, ENGLAND.

ROAD-VEHICLE SUSPENSION ARRANGEMENT.

1,037,730.  Specification of Letters Patent.  Patented Sept. 3, 1912.

Application filed February 6, 1909. Serial No. 476,551.

*To all whom it may concern:*

Be it known that I, LEONARD EUGENE COWEY, a subject of the King of Great Britain, residing at Archer Works, Station avenue, Kew Gardens, in the county of Surrey, England, have invented certain new and useful Improvements Relating to Road-Vehicle Suspension Arrangements, of which the following is a specification.

This invention relates to the supporting of the bodies or frames of road vehicles in relation to their axles through the intervention of suspension arrangements of a yielding character adapted to permit of vibratory or undulatory movement of the axles due to traveling over rough or uneven roads.

The chief object of this invention is to construct the apparatus in such a manner that it will exert a practically constant resistance under the influence of such movement whereby any liability of a corresponding movement being imparted to the body of the vehicle is reduced to a minimum, and at the same time will have the degree of such resistance automatically regulated by relative movements of the axles and frame due to change or variation in the load or weight supported by the suspension arrangements, irrespective of relative movements of such parts caused by road shocks and vibrations.

According to this invention the frame or body of the vehicle is supported from the axles by self regulating cushioning devices adapted to maintain such parts at an average distance from each other and to exert a practically constant resistance between the same during vibratory or undulatory movement of the axles, any change (other than a momentary change) in the average distance between the frame and axle such as is occasioned for example by a variation in the load, automatically causing the resistance of the cushioning device to be regulated to meet the said variation in the load and to restore the average distance between the frame and axle.

An important feature of my invention when pneumatic cushioning devices of the plunger and cylinder type are employed comprises a valve device possessing a certain inertia of movement and arranged in yielding connection with one or the other of the parts of the cushioning device, which connection is adapted to allow the valve device to remain unaffected by vibratory changes in the relative position of such parts, but to be actuated by a comparatively prolonged change in the aforesaid relative position for increasing or diminishing the pressure in the cushioning device.

A further important feature of my invention for use in connection with a cushioning device of the above mentioned type comprises an oil or other liquid circulating system operated by the circulation of an elastic fluid to and from the cushioning devices to maintain a body of oil or other liquid on the load supporting pistons and to return excess of the oil or other liquid to a main storage chamber.

Four self-regulating cushioning devices may be employed and each of such devices may comprise a pressure chamber and a cylinder of small diameter in relation thereto carrying a piston connected to the axle. A supply of fluid such as air and oil is forced into each pressure chamber from a main storage chamber by a pump driven from any convenient source of power, and adapted to maintain the pressure in the storage chamber at a somewhat higher pressure than is actually required for supporting the maximum load through the pistons of the pressure chambers. The air serves to maintain an average relative position between the pressure chamber and the pistons and the oil lubricates and maintains an air tight joint between the pistons and the cylinders. Any change in the said average position other than a momentary change automatically controls an arrangement of valves communicating with each pressure chamber for increasing or decreasing the pressure of the fluid therein to restore the average relative position of the pressure chamber and piston.

In order that my said invention may be clearly understood and readily carried into effect, I will describe the same more fully with reference to the accompanying drawings in which:—

Figure 1 is a plan showing a general arrangement of the apparatus as applied to a motor vehicle. Fig. 2 is a vertical section of one of the supporting devices. Fig. 2ᵃ is a detail view on an enlarged scale showing the parts more clearly than in Fig. 2. Fig. 3 is a vertical section of a portion of the main storage chamber. Fig. 4 is a vertical section of the pump and pump chamber. Fig. 5 is a horizontal section taken on line 4—4 of Fig. 4.

Referring more particularly to Figs. 1 to 5, A represents the vehicle frame and B the axles, C the pressure chambers, D the cylinders and E the pistons which are situated therein, F the main storage chamber and G the pump. Each of the pressure chambers C may conveniently comprise a spherical chamber arranged to inclose a portion of its respective cylinder D the upper end of which is in open communication with the said chamber (Figs. 2 and 2ª). The lower portion of each cylinder projects below the spherical chamber and may be connected to the side members $A^1$ of the vehicle frame A in such a manner as to occupy a position between such members and the road wheels as shown in Fig. 1. Each piston E is provided with rings $e$ for making a tight joint with the wall of the cylinder and is formed with a cavity for the reception of a removable block $e^1$ which constitutes a thrust bearing for a ball $e^2$ formed on the end of a connecting rod $e^3$, the opposite end of which is provided with a removable ball $e^4$ adapted to make a ball and socket joint with its respective axle B. The rod $e^3$ is connected to the piston by a socket ring $e^5$ which is screwed therein and bears against the adjacent portion of the ball $e^2$. A similar arrangement is provided at the opposite end of the rod $e^3$ for connecting the same with its axle B. The lower end of the cylinder terminates in an outwardly projecting flange $d$ to which a cap $d^1$ is bolted or otherwise secured and is caused to make a tight joint therewith through the intervenion of a leather or other suitable packing ring $d^2$. Extending around the inner face of the cap $d^1$ is a channel $d^3$ for receiving any oil which may leak past the piston E, the said channel being formed with an outlet $d^4$ and communicating with the interior of the cylinder by passages $d^5$ formed in the face of the flange $d$. To prevent the escape of oil from the lower end of the cylinder, otherwise than through the outlet $d^4$, a floating washer $d^{5x}$ is interposed between the cap $d^1$ and the flange $d$ which latter is recessed at $d^6$ to receive the said washer. A tight joint is made between the lower face of the washer and the adjacent face of the cap $d^1$ by a leather or other suitable packing ring $d^7$. The aforesaid washer is formed with a central aperture for the piston rod which is encircled by a flanged ring $d^8$ of leather or other suitable material secured to the floating washer $d^{5x}$ for preventing leakage of oil between the latter and the piston rod.

Each of the pressure chambers is provided at its upper part with a removable cap $C^1$ which carries the valve device and the mechanism for actuating the same. This valve device comprises an inlet valve J and an outlet valve K. The inlet valve J is provided with a spindle $j$ which projects through the center of a cylindrical boss extending from the inner face of the cap $C^1$ and formed with an intermediate portion $C^2$ of a reduced diameter situated between two portions $C^3$ $C^4$ of larger diameter. This boss constitutes a guide for the valve spindle and is formed at its upper end with a seating $C^5$ for the said valve to rest upon, the latter being provided with an upwardly extending member $j^1$ to receive a weak coiled spring $j^2$ arranged to exert pressure upon the top of the valve for normally retaining the latter upon its seating. The portions $C^3$ $C^4$ of the aforesaid boss constitute a guide for a cup shaped cylinder $C^6$ which is slidably mounted thereon and together with the said portions constitutes a dashpot which operates in the manner hereinafter described. The cylinder $C^6$ is closed at its lower end and is surrounded by an outer wall $C^7$ the lower end of which dips concentrically into the upper end of the cylinder D. Extending around the upper end of the outer wall $C^7$ is a flange $C^8$ adapted to engage with inwardly flanged segmental portions $C^9$ which are bolted or otherwise secured to the cap $C^1$ and serve as a means for limiting the downward movement of the cylinder $C^6$. Formed in the upper wall of the cylinder $C^6$ are one or more openings $C^{10}$ which communicate with one or more recesses $C^{11}$ formed in the portion $C^3$ of the boss, and leading to a chamber $C^{12}$ situated below the valve J through one or more transversely arranged passages $C^{13}$. The lower part of the valve stem $j$ is in open communication with the interior of the cylinder $C^6$ through a passage $C^{14}$ extending transversely across the reduced portion $C^2$ of the boss immediately above the lower portion $C^4$ thereof. This last mentioned portion constitutes a fixed piston in relation to the slidably mounted cylinder $C^6$ and is formed with a small passage $C^{15}$ extending through the same. The aforesaid cylinder is adapted to contain oil up to the level of the openings $C^{10}$, and the piston $C^4$ is immersed in such oil which fills the space below the same through the passage $C^{15}$. The cylinder $C^6$ is caused to normally occupy a position in which its lower end just clears the end of the valve stem $j$. This is effected by means of a spring $E^1$ which extends between the said cylinder and the piston E and is supported thereon in a state of rest as long as a normal relative position between the latter and the cylinder D is maintained and the piston is free from movement relatively to its cylinder. The aforesaid spring encircles the cylinder $C^6$ at its upper end to which it is connected in any appropriate manner and is attached to the top of the piston E by a cup ring $E^2$ connected thereto.

The inlet valve J communicates through a pipe $f$ with the main storage chamber F a portion of which is shown in Fig. 3, the said pipe being connected to a T piece $f^1$ by a union joint $f^2$. The stem of the T piece is provided with a lock up cock $f^3$ having a handle $f^4$ adapted to be actuated from any convenient part of the vehicle as shown in Fig. 1 for example, and is removably connected to the top of the chamber F by a gland $f^5$ arranged to screw into a stuffing box $f^6$ and to exert pressure upon a flange $f^7$ formed on the T piece for compressing suitable packing $f^8$ interposed between the said flange and the bottom of the stuffing box. Connected to the stem of the T piece is a pipe $f^9$ which opens at its lower end into a sump $f^{10}$ formed in the bottom of the chamber F and this pipe is surrounded by a pipe $f^{11}$ which is also connected to the stem of the T piece and is provided with one or more apertures $f^{12}$ at its upper end, its lower end terminating in the aforesaid sump below the end of the pipe $f^9$ and having a small aperture $f^{13}$ formed therein. The perforated pipes $f^9$ and $f^{11}$ act as a spraying device when the pressure fluid is drawn from the chamber F, so that the supply to the cylinder through the inlet valve J is in the form of a spray or intimate mixture of the gas and liquid.

The outlet valve K is situated at the lower end of a tube $k$ which depends from the cover $C^1$ into proximity to the lower end of the chamber C. The lower end of the said tube constitutes the seating for the valve K which is normally retained upon such seating by a stem $k^1$ connected at its upper end to a coiled spring $k^2$ situated within the tube $k$ and retained in a state of tension therein through the connection $k^3$. Encircling the tube $k$ for the greater portion of its length and free to slide thereon is a tube $k^4$ and between this tube and the tube $k$ is an annular space $k^5$ communicating at its upper end with the interior of the chamber C by means of a suitable airway such as $k^6$ formed between the said tubes, and at its lower end with a similar airway $k^7$ which is put into communication with the interior of the pipe $k$ when the valve K is opened. The lower end of the tube $k^4$ is provided with a cap $k^8$ in which is formed a hole $k^9$ for the passage of an extension $k^{10}$ projecting from the valve K. This hole is made slightly larger than the aforesaid extension for the entrance of oil which collects in the pressure chamber C in the manner hereinafter described. The valve extension $k^{10}$ is provided with a laterally projecting pin $k^{11}$ which supports the weight of the slidably mounted tube $k^4$. Pivoted to the upper end of the latter is a two-armed lever $k^{12}$ one end of which is forked and rests against the underside of a flange $C^{16}$ extending around the outer wall $C^7$ of the cylinder $C^6$, the opposite end of such lever being arranged to bear against an abutment $k^{13}$ mounted on the fixed tube $k$. The upper end of the latter is connected to an outlet pipe $k^{14}$ which is attached to a branch connection piece $k^{15}$ to which is attached a short pipe $k^{16}$ communicating with the aperture $d^4$ at the lower end of the cylinder D.

A pipe $k^{17}$ leads to a T-piece $k^{19}$ on the pump G (Fig. 5) to which is also connected a similar pipe $k^{17}$ leading from a connection piece $k^{15}$ of the pressure chamber C at the opposite side of the vehicle. The tubes to which the valve K belongs serve, in conjunction with the said valve, as a spray producer so that the liquid which accumulates in the overflow space at the bottom of the chamber C is removed along with the gaseous fluid as a spray. Pipes $k^{18}$ extend from the connection piece $k^{15}$ to the pressure chambers C appertaining to the rear axle of the vehicle.

Any suitable form of pump may be employed for supplying the main storage chamber F with fluid under pressure and in the example shown in Fig. 4 the pump comprises a cylinder $g$ supported from a crank chamber $g^1$ which is adapted to occupy a position concentrically with the half time shaft L of the engine on which is mounted a counter-balanced crank $g^2$ to which the piston $g^3$ is connected by the rod $g^4$. A convenient connection between the piston and its rod consists in forming a ball $g^5$ on the inner end of the latter, and in constructing the interior of the piston to receive such ball and to permit of the required movement of the piston rod. The piston rod end $g^6$ which encircles the crank pin, is removably secured to the piston rod to enable the latter to be inserted through the piston, in which it is supported by an adjustable block $g^7$ which is screwed into the piston and secured by a suitable locking device such as a set screw $g^8$ passing through the wall of the piston. The pump cylinder $g$ is inclosed within a reservoir or chamber $g^9$ which is bolted or otherwise secured to the aforesaid crank chamber $g^1$. The upper end of the pump cylinder opens into the crank chamber slightly above the level of the top of the chamber $g^9$ and extending down one side of the aforesaid cylinder is an air passage $g^{10}$ in the wall of which is formed an aperture $g^{11}$ for the entrance of oil with which the surrounding chamber is partly filled. The passage $g^{10}$ leads to the underside of a suction valve $g^{12}$ which is provided with a spring $g^{13}$ for normally retaining the said valve upon a seating formed in the bottom of the cylinder. Situated by the side of the suction valve $g^{12}$ is a delivery valve $g^{14}$ which is also provided with a spring $g^{15}$ for normally causing the said valve to close an opening $g^{16}$ formed in the bottom of the cylinder. Situated below the valve $g^{14}$ is a chamber $g^{17}$ provided with an outlet $g^{18}$ to which a pipe $g^{19}$ is connected by a union joint $g^{20}$. This pipe extends vertically behind the cylinder $g$ and passes through an opening in the flanged portions $g^{21}$ of the reservoir and crank chamber. The pipe $g^{19}$ is connected to a pipe $d^{28}$ (Figs. 1 and 3) which is connected to the top of the main storage chamber F and extends into a sump $f^{14}$ formed in the bottom thereof, the connection between the pipe $d^{28}$ and the top of the cylinder being effected in a similar manner to that described with reference to the T piece $f^{1}$. When the lock up cock $f^{3}$ is closed any leakage of air and oil past the valve $g^{14}$ (Fig. 4) causes the oil in the sump $f^{14}$ to rise in the pipe $d^{28}$ and ultimately reach the seating of the said valve thus sealing it against further leakage of air.

Springs of the ordinary type may be connected to the vehicle frame and be adapted to rest upon the wheel axles for supporting the body of the vehicle when there is little or no pressure in the pressure chambers. In this condition the vehicle frame occupies a position comparatively close to the axles and each of the load supporting pistons E is at or toward the inner end of its respective cylinder, with the result that the spring $E^{1}$ between each load supporting piston and the sliding cylinder $C^{6}$ is sufficiently compressed to raise the latter to the top of its traverse whereby the lower end of the said cylinder comes into contact with the spindle of the inlet valve J and opens the latter. In this condition if the pump G is set in motion fluid under pressure is delivered to the main storage chamber F and passes from the latter through the various inlet valves J to each pressure chamber C thereby raising the pressure therein and lifting the body of the vehicle until each of the load supporting pistons E occupies an approximately midway position in its respective cylinder as shown in Fig. 2. The springs $E^{1}$ which actuate the sliding cylinders $C^{6}$ are now brought to a state of rest and support the said members in such a position that the inlet valves are allowed to close by the action of the light spring $j^{2}$. When the axles are subjected to vibratory movement such as occurs when the vehicle is traveling over a rough or uneven road the pistons will be displaced within their respective cylinders to one side or the other of the aforesaid midway position. This movement does not however materially alter the resistance offered by each piston to its displacement, owing to the fact that the combined volume of the cylinder and pressure chamber is very slightly altered, consequently the fluid under pressure undergoes a very slightly modified compression by the maximum traverse of the piston within its cylinder, and the slight alteration in the resistance upon the piston between the commencement and termination of its stroke is not sufficient to overcome the inertia of the weight of the frame or body of the vehicle, and the latter remains practically unaffected by the movement of the pistons. The sliding cylinder connected with each piston also remains practically unmoved by the aforesaid vibratory movement owing to the fact that the majority of such movements are momentary, that is to say the average relative position of the piston and cylinder is restored almost immediately after each variation therein, and before the pressure or tension of the spring is able to impart any material movement of the piston to the comparatively slowly moving sliding cylinder, the said pressure or tension is removed and the spring is again restored to a state of rest. When however the aforesaid average relative position remains displaced for a sufficient period of time and for example in a direction to enable the compression imparted to the spring to overcome the comparative inertia of the sliding cylinder the latter is moved in a direction to open the inlet valve for increasing the pressure of the fluid in the pressure chamber until the average relative position is again adjusted and the inlet valve allowed to close. The air or other fluid in the main storage chamber is compressed therein at a higher pressure than is required for supporting the maximum load the suspension arrangements are intended to carry and the pump plunger may be conveniently arranged to travel sufficiently close to the pressure end of its cylinder to compress the air therein to the required degree of pressure so that only on a reduction of pressure in the said storage chamber will air pass from the pump thereto. If the support afforded by the spring $E^{1}$ to the sliding cylinder $C^{6}$ is withdrawn and the spring brought into tension for a sufficient length of time to cause the said cylinder to move in a downward direction, the flange $C^{16}$ thereon, actuates the forked lever $k^{12}$ to depress the slidably mounted tube $k^{4}$ thereby causing the cap upon the end of the same to bear against the pin $k^{11}$ with the result that the outlet valve K is lifted off its seating against the action of its spring $k^{2}$. The excess of pressure then returns to the pump casing through the pipes $k^{14}$ $k^{17}$ and escapes through a vent $g^{23}$ situated at the top of the crank chamber $g^{1}$. When the average relative position is again restored the sliding cylinder $C^{6}$ is lifted by the spring $E^{1}$ whereupon the spring $k^{2}$ closes the outlet valve K and simultaneously returns the slidably mounted tube $k^{4}$ and the forked lever $k^{12}$ to their original positions. The pressure in each of the pressure chambers is independently controlled and in the event of the load being increased on one portion of the frame, the pressure in the pressure chamber which is nearest to that portion of the frame will be increased to meet the increase in the load, if the load on that portion is decreased the reverse action will take place. It will thus be seen that no uneven displacement of the body of the vehicle will be maintained under the influence of an unevenly distributed load, and that whether the load be heavy or light the average distance between the vehicle frame and the axles will always be the same thereby allowing a maximum vibratory movement of the axles for cushioning purposes under all conditions.

To maintain a constant supply of oil upon the pressure side of each of the load supporting pistons, the pump chamber $g^9$ (Figs. 4 and 5) is filled with oil through a filler $g^{24}$ approximately to the level $g^{25}$ which represents the highest oil level. During this operation the oil gradually rises in the air passage $g^{10}$ to the level of the oil in the chamber through the opening $g^{11}$ which governs the position of the lowest oil level, (indicated by the line $g^{26}$). This level is so arranged that the lower part of the cylinder and valves are submerged in oil which acts as a cooling medium for the same. At the first suction stroke of the pump piston, oil is drawn into the pump cylinder from the passage $g^{10}$ and is followed by air from the crank chamber. This charge of air and oil is expelled from the cylinder on the succeeding compression stroke of the piston and is forced through the connections above described into the main storage chamber F. At each succeeding suction stroke of the pump piston the cylinder is filled with air and with any oil that may enter the air passage $g^{10}$ through the opening $g^{11}$ and on the next succeeding compression stroke, the air and oil are expelled from the cylinder into the aforesaid storage chamber F. When the pressure in the latter has attained the predetermined limit, the piston simply works up and down in the pump cylinder without actuating either the suction or the delivery valve. The storage chamber will now contain air under pressure and a certain quantity of oil which will enter the pipe $f^{11}$ through the opening $f^{13}$ to the level of the oil in the said chamber. If during the above described operation the lock up cock $f^3$ and the inlet valves J have been open, air and oil will have been discharged through the passages $C^{13}$ into the various pressure chambers. The oil will first collect in each dash pot up to the level of the apertures $C^{10}$ an excess of oil will flow through the latter and drip onto the upper face of the load supporting piston E. Excess of oil on the latter is discharged from the open end of the cylinder into the pressure chamber by the piston as the latter approaches such end during its vibratory movements. As the oil accumulates in the pressure chamber C it fills the pipe $k^4$ to the level of the oil in the pressure chamber, and every time the fluid outlet valve is opened to relieve the pressure of air in the pressure chamber, the oil is forced out of the pipe $k^4$ into the pipe $k$ and is followed by a mixture of air and oil, the latter passing up the pipe $k$ in the form of a spray as soon as it enters the pipe $k^4$ through the aperture $k^9$ in the cap $k^5$. The mixture of air and oil is then returned to the pump chamber through the pipes $k^{14}$ $k^{17}$. Any oil that may have leaked past the piston E collects in the channel $d^8$ and passes therefrom into the pipes $k^{16}$ $k^{17}$ and is returned through the latter to the pump chamber. Excess of oil in the latter is returned to the main storage chamber by the action of the pump which first withdraws oil and subsequently air and oil from the air passage in the pump chamber in the manner above described. By this arrangement a supply of oil is always maintained upon the upper side of each load supporting piston, excess of oil in the pressure and pump chambers is always returned to the main storage chamber, and excess of air in the pressure chambers is allowed to escape freely when required and is not obstructed in its passage by the oil. This is due to the fact that the air passes through the pipes quicker than the oil can enter the same, with the result that the oil is withdrawn in the form of a spray as soon as it enters the pipes. This remark also applies to the passage of air and oil from the pump chamber and main storage chamber. The oil on its return to the pump chamber enters the latter in a vaporized condition and collects on the top of the piston as shown in Fig. 4 thereby effectually lubricating the ball connection between the same and the piston rod. The end $g^6$ of the latter is formed with an upwardly extending lip $g^{24x}$ arranged behind an oil passage $g^{25x}$ formed in the said end. At each revolution of the crank $g^2$ the lip $g^{24x}$ travels close past the inner end of the vent $g^{23}$ which is caused to project slightly within the interior of the crank chamber. This vent is provided with a number of inclined baffle plates $g^{26x}$ and a gauze or other filtering device $g^{27}$ to filter the air as it enters the crank chamber. The oil collects upon the aforesaid baffle plates and trickles down the same and through a series of openings $g^{28}$ and is wiped off the inwardly projecting end of the said vent by the lip $g^{24x}$ each time the latter passes the same, with the result that the oil collects in the oil passage $g^{25x}$ and the crank pin is effectually lubricated.

Instead of arranging that the piston of the pump shall only come within a certain distance from the bottom of its cylinder as hereinbefore described it may be convenient to allow the piston to descend to the bottom of its cylinder. In this case a relief valve is fitted in the bottom of the cylinder at $g^{14x}$ (Fig. 5) and is arranged to control an outlet $g^{18x}$ leading from the cylinder to the pump casing $g^9$. The relief valve may be of the same construction as the outlet valve $g^{14}$ of the pump and be adapted to open at a predetermined pressure to permit of the excess air and oil being returned to the pump chamber $g^9$.

In applying the invention to a steam propelled vehicle the pump is dispensed with and the main storage chamber F is supplied directly from the generator through the intervention of a pressure reducing valve if necessary. In this arrangement the condensed steam takes the place of oil throughout the system, and means may be provided for allowing the condensed steam and also the live steam to escape to the atmosphere from each cylinder, or to be conveyed to the generator feed pump, or to any other suitable part of the steam generating system, as may be most convenient. The various parts may be insulated against radiation of heat where required.

Any suitable number of the load supporting cylinders may be employed and in some cases it may be convenient to arrange the cylinders in such a manner as to constitute a three joint suspension.

What I claim and desire to secure by Letters Patent of the United States is:—

1. In a vehicle fluid pressure suspension arrangement, a pressure cylinder, a load supporting piston within the cylinder, valves controlling the pressure fluid, a liquid dash pot member adapted to operate the said valves and a spring connection between the dash pot member and the piston, adapted to transmit movements of the piston to the dash pot.

2. In a vehicle fluid pressure suspension arrangement, a pressure cylinder, a load supporting piston within the cylinder, an inlet and an outlet valve for the pressure fluid, a liquid dash pot member, connections from the dash pot member to each valve, adapted to operate them by contrary movements of the said member, and a spring connection between the dash pot member and the piston.

3. In a road vehicle suspension arrangement, the combination with load supporting pistons and cylinders, of pressure chambers arranged in open communication with the cylinders, a main storage chamber, means for supplying the same with fluid under pressure, inertia devices arranged in yielding connection with the load supporting pistons, inlet and outlet valves actuated by movement of the inertia devices, and passages connecting the said valves with the main storage chamber.

4. In a road vehicle suspension arrangement of the piston and cylinder type, the combination with a load supporting piston and cylinder, of a pressure chamber arranged in open communication with the latter, a dash pot member resiliently connected to the load supporting piston, an inlet valve actuated by movement of the dash pot member in one direction, and an outlet valve actuated by movement of the dash pot member in the other direction.

5. In a vehicle suspension apparatus employing combined liquid and elastic fluid pressure, a pressure cylinder, a chamber inclosing the upper end of the cylinder and adapted to provide a liquid overflow from the cylinder, a load supporting piston, an inlet valve at the upper end of the said cylinder, an outlet valve at the bottom of the overflow chamber adapted to discharge overflow liquid and gaseous fluid, and an inertia device resiliently connected to the piston and adapted to operate both the said valves by opposite movements.

6. In a road vehicle suspension arrangement employing combined liquid and elastic fluid pressure, a pressure cylinder, a load supporting piston on which the liquid falls, a liquid overflow chamber for the cylinder, an inlet valve, above the piston, an outlet valve situated at the bottom of the said overflow chamber and a spraying device at the outlet valve adapted to discharge the excess mixed liquid and gaseous fluid as a spray.

7. In a road vehicle suspension arrangement employing combined liquid and elastic fluid pressure, a pressure cylinder, a load supporting piston, a liquid overflow chamber for the cylinder, means for supplying to the cylinder combined liquid and elastic fluid as a spray under pressure, a dash pot situated above the said piston, adapted to receive liquid from the pressure supply and to deposit excess of liquid upon the piston, a spring connection between the dash pot and piston and pressure controlling valves operated by the said dash pot.

In testimony whereof I affix my signature in presence of two witnesses.

LEONARD EUGENE COWEY.

Witnesses:
T. SELBY WARDLE,
WALTER T. SKERTEN.